(12) United States Patent
Marko

(10) Patent No.: US 9,998,890 B2
(45) Date of Patent: Jun. 12, 2018

(54) METHOD AND APPARATUS FOR CONTENT NAVIGATION IN DIGITAL BROADCAST RADIO

(76) Inventor: Paul Marko, Pembroke Pines, FL (US)

( * ) Notice: Subject to any disclaimer, the term of this patent is extended or adjusted under 35 U.S.C. 154(b) by 1092 days.

(21) Appl. No.: 13/189,674

(22) Filed: Jul. 25, 2011

(65) Prior Publication Data
US 2012/0028567 A1 Feb. 2, 2012

Related U.S. Application Data

(60) Provisional application No. 61/369,038, filed on Jul. 29, 2010.

(51) Int. Cl.
H04W 4/20 (2018.01)
H04W 4/06 (2009.01)

(52) U.S. Cl.
CPC ............ *H04W 4/20* (2013.01); *H04W 4/206* (2013.01); *H04H 2201/18* (2013.01); *H04W 4/06* (2013.01)

(58) Field of Classification Search
CPC .......... H04W 4/20–4/206; H04W 4/06; H04H 2201/18
USPC ....................... 455/12.1, 3.01–3.06
See application file for complete search history.

(56) References Cited

U.S. PATENT DOCUMENTS

| | | | | |
|---|---|---|---|---|
| 5,572,442 A * | 11/1996 | Schulhof et al. | ............. | 709/219 |
| 5,815,671 A * | 9/1998 | Morrison | ...................... | 709/247 |
| 5,886,995 A * | 3/1999 | Arsenault et al. | ............ | 370/477 |
| 6,029,045 A * | 2/2000 | Picco et al. | ...................... | 725/34 |
| 6,588,015 B1 * | 7/2003 | Eyer | .................... | H04H 20/106 704/500 |
| 6,771,644 B1 | 8/2004 | Brassil | | |
| 6,831,960 B2 * | 12/2004 | Ohsawa | ........................ | 375/357 |
| 7,180,917 B1 | 2/2007 | Marko | | |
| 7,421,243 B2 * | 9/2008 | Sato et al. | ................... | 455/3.01 |
| 7,555,020 B2 * | 6/2009 | Marko et al. | ................. | 370/535 |
| 7,822,381 B2 | 10/2010 | Mantel | | |
| 8,331,772 B1 * | 12/2012 | Zdepski | ................ | H04N 5/783 386/205 |
| 2002/0071658 A1 * | 6/2002 | Marko et al. | ................... | 386/70 |

(Continued)

OTHER PUBLICATIONS

Consumer Electronics Association, "National Radio Systems Committee", In-Band/On-Channel Digital Radio Broadcasting Standard NRSC-5, pp. 1-46, Apr. 2005.

(Continued)

*Primary Examiner* — Raymond Dean
(74) *Attorney, Agent, or Firm* — Fleit Gibbons Gutman Bongini Bianco PL; Jon A. Gibbons

(57) ABSTRACT

A low cost DAB multichannel receiver comprising a simplified buffering method for buffering content segments from multiple streams contained within the DAB channel, where the receiver enables the listener to navigate buffered content segments from multiple streams within the DAB channel while enabling the broadcaster to control the time-shift of commercial content to the receiver output stream. The receiver's buffered content grows over time and is cleared when tuning away from the channel, thus encouraging listeners desiring to tune in to new content to instead navigate to new buffered segments. Broadcaster control of the listener experience may be enabled by setting content control fields which are observed in the broadcast by the multichannel receivers. Additional embodiments are disclosed.

13 Claims, 10 Drawing Sheets

(56) References Cited

U.S. PATENT DOCUMENTS

| | | | |
|---|---|---|---|
| 2003/0031455 A1* | 2/2003 | Sagar | G06Q 30/0247 386/234 |
| 2003/0063628 A1* | 4/2003 | Marko et al. | 370/535 |
| 2004/0008642 A1* | 1/2004 | Marko et al. | 370/321 |
| 2004/0014461 A1* | 1/2004 | Theimer | 455/418 |
| 2005/0282564 A1* | 12/2005 | Yoo | 455/466 |
| 2006/0190970 A1 | 8/2006 | Hellman | |
| 2006/0280206 A1* | 12/2006 | Marko | 370/477 |
| 2007/0014536 A1* | 1/2007 | Hellman | 386/94 |
| 2008/0163290 A1* | 7/2008 | Marko | 725/32 |
| 2008/0163291 A1 | 7/2008 | Fishman | |
| 2008/0209320 A1* | 8/2008 | Mawhinney | G06F 17/30905 715/700 |
| 2009/0022472 A1* | 1/2009 | Bronstein et al. | 386/52 |
| 2009/0053991 A1* | 2/2009 | Mantel et al. | 455/3.04 |
| 2009/0061762 A1* | 3/2009 | Patsiokas et al. | 455/3.02 |
| 2009/0070597 A1 | 3/2009 | Shah | |
| 2009/0268567 A1* | 10/2009 | Marko et al. | 369/7 |
| 2009/0279850 A1* | 11/2009 | Hirata | H04N 5/76 386/248 |
| 2009/0320075 A1 | 12/2009 | Marko | |
| 2010/0003007 A1* | 1/2010 | Itakura | 386/68 |
| 2010/0138853 A1* | 6/2010 | Tanaka | 725/23 |
| 2010/0265398 A1* | 10/2010 | Johnson | H04H 20/30 348/500 |
| 2012/0131098 A1* | 5/2012 | Wood | G06F 3/0482 709/203 |

OTHER PUBLICATIONS

National, Association of Broadcasters, "Updated NRSC-5 Standard Published", Submission of NRSC-5, pp. 1-52, Jun. 2, 2008.

* cited by examiner

METHOD AND APPARATUS FOR CONTENT NAVIGATION IN DIGITAL BROADCAST RADIO

CROSS-REFERENCE TO RELATED APPLICATIONS

This application claims priority to U.S. Provisional Patent Application Ser. No. 61/369,038 filed Jul. 29, 2010 the disclosures of which are hereby incorporated by reference in their entirety.

FIELD

The embodiments relate to a system and method for providing AM and FM broadcast radio station listeners the ability to preview and select content segments during non-commercial periods (and during commercial periods under certain conditions) of a broadcast in order to reduce channel changes. More specifically, the embodiment relates to a system and method for assembling a broadcast and receiving said broadcast to enable listeners with new interactive receivers the ability to preview and select from a plurality of content segments without changing channels and to enable listeners with legacy receivers the ability to access available content by tuning to supplemental channels within the station broadcast.

BACKGROUND

Many traditional AM and FM stations configured for real-time broadcasts are suffering from reduced listenership due to an array of competitive audio entertainment sources available to listeners. A relatively new competitor to AM and FM is Satellite Radio, which offers over 150 real-time broadcast channels of talk and commercial free music. Satellite Radio is luring away terrestrial radio listeners and is approaching 20 million subscribers with an average of 2 listeners per subscription. According to a 2007 Arbitron Satellite Radio Report, the primary attraction of satellite radio is commercial-free music, with 80% of the listener Average Quarter Hours (AQH) associated with the commercial-free music channels on the XM system, where AQH averages all day parts to determine the number of persons listening to a particular radio station for at least five minutes during a 15-minute period. To an extent countering the growing threat from satellite radio, broadcast radio has begun a transition to in-band on-channel (IBOC) digital audio broadcasts (DAB), with hybrid mode transmissions which enable broadcasters to continue to transmit analog AM and FM broadcasts while offering one or more new supplemental digital audio channels utilizing the data bandwidth in the IBOC hybrid waveform. As more AM and FM broadcasters transition to the hybrid waveform, and more IBOC capable receivers are accessible to listeners, it is possible that with availability of additional content, more listeners will feel less compelled to leave terrestrial radio for Satellite Radio. However, IBOC's new functionality, including digital audio and supplementary channels, has not generated a rapid consumer transition to new radios, which is limiting the technology's impact on the erosion of AM and FM listenership.

Access to content provided by portable media players and personalized radio services such as Pandora is also continuing to draw listeners away from AM and FM. Personal media players such as iPods have already exceeded 200 million in total sales while drawing younger listeners away from broadcast radio. Pandora's personalized radio service continues to grow rapidly with more than 46 million listeners and caters to a core listener group between 18 and 34 years old. By contrast, Sirius XM's core group is 35 to 44. This data implies that the respective radio services are catering to the listening habits of different demographics. One hypothetical reason for this is the older generation, raised with exposure to vinyl records, cassette tapes and AM/FM radio, may be more content waiting out an undesirable audio segment in the broadcast stream than the younger generation, raised with CD players, MP3 players and internet music sites which enable the instant navigation of content on command. Presently, listeners looking to escape undesired segments in a broadcast radio stream must change the channel, more often than not settling on a new channel in the middle of an audio segment. This generally results in an undesired outcome for both the listener and station broadcaster, as the listener has missed the beginning of the new audio segment and the broadcaster loses a listener to a competitive station.

The personalized listening experience that Pandora provides is based on the Music Genome Project's ability to generate a channel playlist matching a subscriber's preference using an input as simple as a favorite song. The Music Genome Project works by rating songs based on almost 400 attributes or genes with each assigned to a specific characteristic of the music. Based on these ratings, algorithms are used to determine which songs in the database best match a subscriber's preferences. However, the resultant personalized channel inevitably will play some content which veers away from the subscriber's taste. Pandora's popularity may lie more in the interactivity enabled in listening to its personalized content stream than in the individual personalized stream itself. This interactivity allows Pandora listeners to skip unappealing audio segments and immediately continue to the next song on the playlist. The appeal of this function is so great that the music rights holders limit the number of skips per hour available in Pandora's free service, and a paid subscription is required to upgrade to unlimited skips. While Pandora's internet based service has limited penetration in the mobile radio market today, advances in mobile wireless internet networks may dramatically increase the availability of Pandora and other internet-based radio services, further impacting AM and FM listenership.

In general, the goal of AM and FM broadcasters is to increase listenership by increasing the time-spent-listening (TSL) or the number of listeners. As the listenership increases, so can the benefit to the broadcaster. For example, a broadcaster with a higher level of listenership for a certain time period can generally charge more to broadcast advertiser's commercials during that time period than can a broadcaster with a lower level of listenership. Accordingly, broadcasters actively pursue various ways to develop listenership. Multiple U.S. Patent Applications have been published which describe opportunities to improve the functionality of digital broadcast receivers in order to attract more listeners. In U.S. Patent Application 2009/0070597 (PA597) entitled "Method and Apparatus for Store and Replay Functions in a Digital Radio Broadcasting Receiver", incorporated herein by reference, a method is described for user controlled storage and replay of broadcast content from an in-band on-channel (IBOC) digital audio broadcast (DAB). IBOC DAB technology enables the simultaneous transmission of multiple audio channels along with data within the spectral mask of existing AM or FM channel allocations. Compliant receivers may be configured to efficiently receive the multiple audio channels contained within a single AM or FM IBOC broadcast channel with one narrowband tuner. The National Radio Systems Committee has adopted an IBOC DAB standard designated NRSC-5A, incorporated herein by reference, which sets forth the requirements for the IBOC Hybrid and all digital broadcasts. HD Radio™ technology, developed by Ibiquity Digital Corporation, is an implementation of the NRSC-5A IBOC standard. Further information regarding HD Radio™ technology can be found at www.hdradio.com and www.ibiquity.com.

Similar to IBOC DAB receivers, satellite radio receivers may be configured to receive multiple audio channels within the satellite radio broadcast with a single tuner. In U.S. Patent Application 2009/0320075 (PA075) entitled "Method and Apparatus for Multiplexing Audio Program Channels from one or more Received Broadcast Streams to Provide a Playlist Style Listening Experience to Users", incorporated herein by reference, a method is described to generate a playlist from multiple radio channels to enable users to preview or navigate through buffered broadcast channel content. While recording multiple channels is well known in the art, a new approach is needed to enable AM and FM broadcasters to leverage the technology to increase listenership, while maintaining the integrity of revenue producing commercial intervals and keeping user costs low with a simplified receiver implementation.

SUMMARY

One embodiment of the present disclosure can entail a multichannel receiver comprising a receiver for receiving content from a multichannel signal that is broadcast containing commercial content and non-commercial content on multiple broadcast streams contained within a single channel and wherein one or more of the broadcast streams among the multiple broadcast streams contains supplemental content, at least one circular buffer for storing at least portions of a Layer 1 service data stream containing the commercial content, non-commercial content, and the supplemental content, and a processor coupled to the receiver. The processor can be operable to selectively navigate among the commercial content, the non-commercial content and the supplemental content without changing a channel and to time shift triggers for commercial content play based on the selective navigation.

Another embodiment of the present disclosure can entail a multichannel receiver unit comprising a receiver for receiving content from a multichannel signal, wherein the multichannel signal is broadcast containing commercial content and non-commercial content on multiple broadcast streams for a single channel and wherein one or more of the broadcast streams among the multiple broadcast streams contains supplemental content, and a processor coupled to the receiver. The processor can be operable to navigate among the commercial content, the non-commercial content and the supplemental content without changing a channel and time shift the play of commercial content based on the navigation among the commercial content, the non-commercial content and the supplemental content.

Yet another embodiment of present disclosure can entail a multichannel broadcast system comprising a transmitter, at least one encoder coupled to the transmitter where commercial audio, non-commercial audio, supplemental content and control information are multiplexed on each IBOC channel of a multichannel broadcast. The multichannel broadcast once demodulated and decoded enables selective navigation among the commercial content, the non-commercial content and the supplemental content without changing an IBOC channel and uses the control information to control the time shift playing of commercial content based on the selective navigation.

Yet another embodiment of the present disclosure comprises a non-transitory computer readable storage medium at a multichannel receiver unit comprising computer instructions to selectively navigate among commercial content, non-commercial content and supplemental content without changing a channel after receiving and decoding content from a multichannel signal that is broadcast containing the commercial content and the non-commercial content on multiple broadcast streams contained within a single channel and time shift triggers for commercial content play based on the selective navigation at the multichannel receiver unit. Note that one of the broadcast streams among the multiple broadcast streams per channel contains the supplemental content. Other embodiments can include methods of navigation in a digital audio broadcast radio and methods of broadcasting a digital audio broadcast in accordance with the disclosed embodiments.

DETAILED DESCRIPTION

Figure 1:
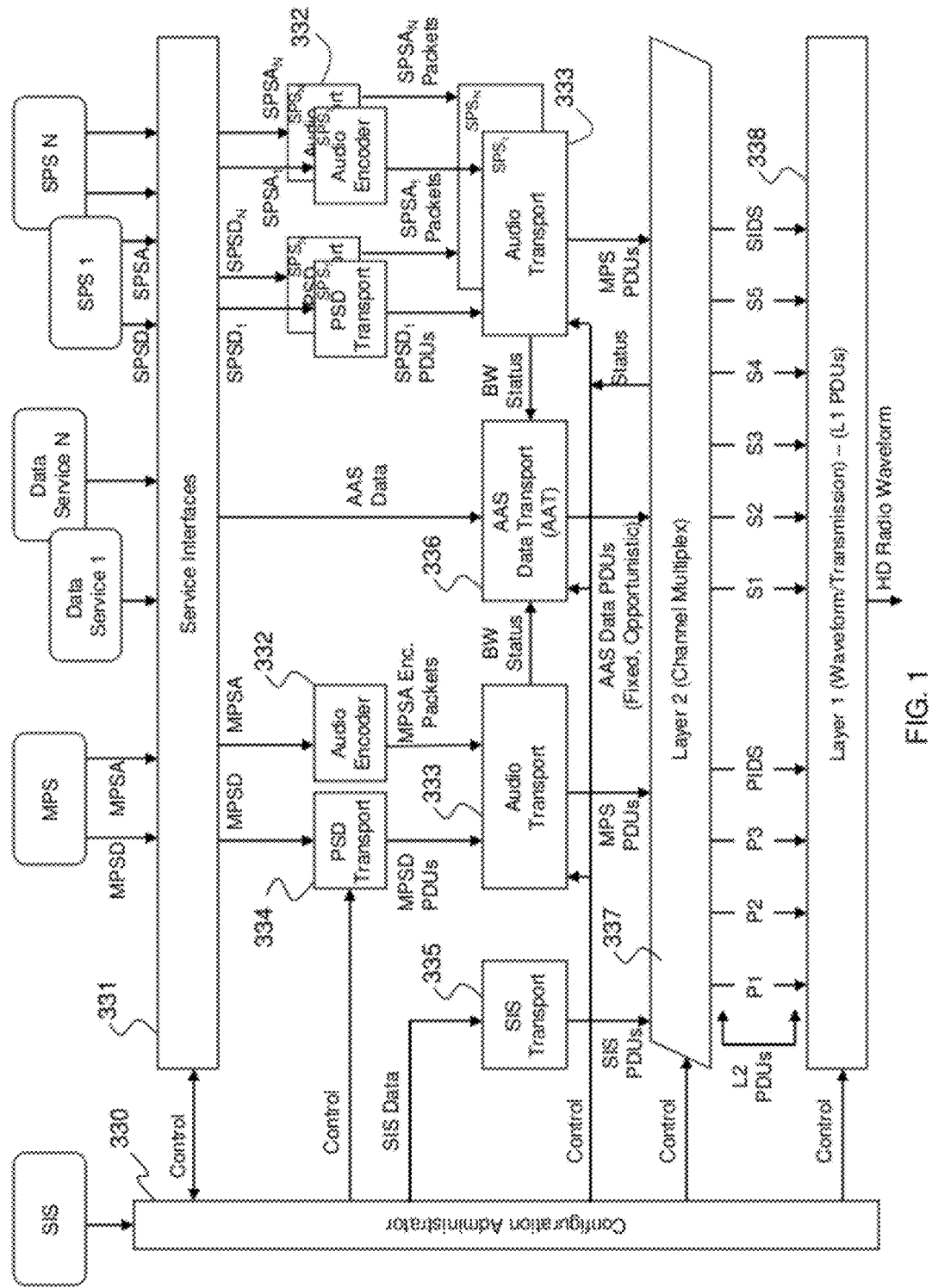
FIG. 1 is a diagram of an IBOC DAB logical protocol stack from the broadcast perspective.

A method and apparatus for content navigation or control in a digital broadcast radio can entail a broadcast system that assembles content in an appropriate broadcast stream and receives the broadcast stream that would enable DAB broadcasters to increase the number of listeners and further increase the time spent listening by reducing channel changing by the very unique nature of the broadcast and/or the decoding and playback at a compatible receiver. The embodiments leverage an efficient, low cost multichannel receiver architecture to enable DAB receivers to provide listener interactivity, expand content exposure, and enable receivers to directly skip or enable listeners to skip commercial content which was previously delivered during the receiving interval to enable more non-commercial content exposure as the dwell time on a channel increases. In such a manner, terrestrial radio or digital AM/FM broadcasters can clawback listenership from MP3 players, wired and wireless internet radio services such as Pandora, Slacker, LastFM and from satellite radio.

At a high level, radio broadcast systems such as Ibiquity's IBOC system can be broken into three major subsystems, the Audio and Data Input Subsystem, the Transport and Service Multiplex Subsystem and the RF/transmission Subsystem. For the Audio and Data Input Subsystem, each audio service has its own source coding, compression and transport system. Similarly, each data service has its own formatting and transport system. These formatted service streams are fed to the Transport and Service Multiplex Subsystem, where the streams are organized into transport packets and multiplexed into a single data stream. Additional data packets are added to the stream prior to multiplexing which contain associated information. This information can include Service information such as the name of the channels, song and artist information, data service information and other associated information. The song and artist information is normally sent at the beginning of each new song or audio segment in the stream and then is repeated as bandwidth permits until the audio segment changes. The multiplexed data stream is fed to the RF/transmission subsystem where channel coding, interleaving and framing is applied prior to modulating the bitstream onto orthogonal frequency division multiplex (OFDM) subcarriers or a QPSK or other carrier and then upconverted to the appropriate RF transmission frequency. The coding and interleaving is used by the receiver to reconstruct the transmitted data, even when the received signal does not exactly match the transmitted signal due to impairments of the channel. The framing applied by the RF/transmission subsystem enables the receiver to synchronize to the transmitted bitstream and to organize deinterleaving and decoder operations with the frame timing. The SiriusXm Satellite system is largely the same as Ibiquity except that the multiplexing step occurs after the coding and interleaving step.

FIG. 1 is a diagram of an IBOC DAB logical protocol stack from the transmitter perspective. From the receiver perspective, the logical stack will be traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIG. 1, there is a configuration administrator 330, which is a system function that supplies configuration and control information to the various entities within the protocol stack. The configuration/control information can include user defined settings, as well as information generated from within the system such as GPS time and position. The service interfaces 331 represent the interfaces for all services except SIS. The service interface may be different for each of the various types of services. For example, for MPS audio and SPS audio, the service interface may be an audio card. For MPS data and SPS data the interfaces may be in the form of different application program interfaces (APIs). For all other data services the interface is in the form of a single API. An audio codec 332 encodes both MPS audio and SPS audio to produce core (Stream 0) and optional enhancement (Stream 1) streams of MPS and SPS audio encoded packets, which are passed to audio transport 333. Audio codec 332 also relays unused capacity status to other parts of the system, thus allowing the inclusion of opportunistic data. MPS and SPS data is processed by program service data (PSD) transport 334 to produce MPS and SPS data PDUs, which are passed to audio transport 333. Audio transport 333 receives encoded audio packets and PSD PDUs and outputs bit streams containing both compressed audio and program service data. The SIS transport 335 receives SIS data from the configuration administrator and generates SIS PDUs. A SIS PDU can contain station identification and location information, program type, as well as absolute time and position correlated to GPS. The AAS data transport 336 receives AAS data from the service interface, as well as opportunistic bandwidth data from the audio transport, and generates AAS data PDUs, which can be based on quality of service parameters. The transport and encoding functions are collectively referred to as Layer 4 of the protocol stack and the corresponding transport PDUs are referred to as Layer 4 PDUs or L4 PDUs. Layer 2, which is the channel multiplex layer, (337) receives transport PDUs from the SIS transport, AAS data transport, and audio transport, and formats them into Layer 2 PDUs. A Layer 2 PDU includes protocol control information and a payload, which can be audio, data, or a combination of audio and data. Layer 2 PDUs are routed through the correct logical channels to Layer 1 (338), wherein a logical channel is a signal path that conducts L1 PDUs through Layer 1 with a specified grade of service. There are multiple Layer 1 logical channels based on service mode, wherein a service mode is a specific configuration of operating parameters specifying throughput, performance level, and selected logical channels. The number of active Layer 1 logical channels and the characteristics defining them vary for each service mode. Status information is also passed between Layer 2 and Layer 1. Layer 1 converts the PDUs from Layer 2 and system control information into an AM or FM IBOC DAB waveform for transmission. Layer 1 processing can include scrambling, channel encoding, interleaving, OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

Figure 2:
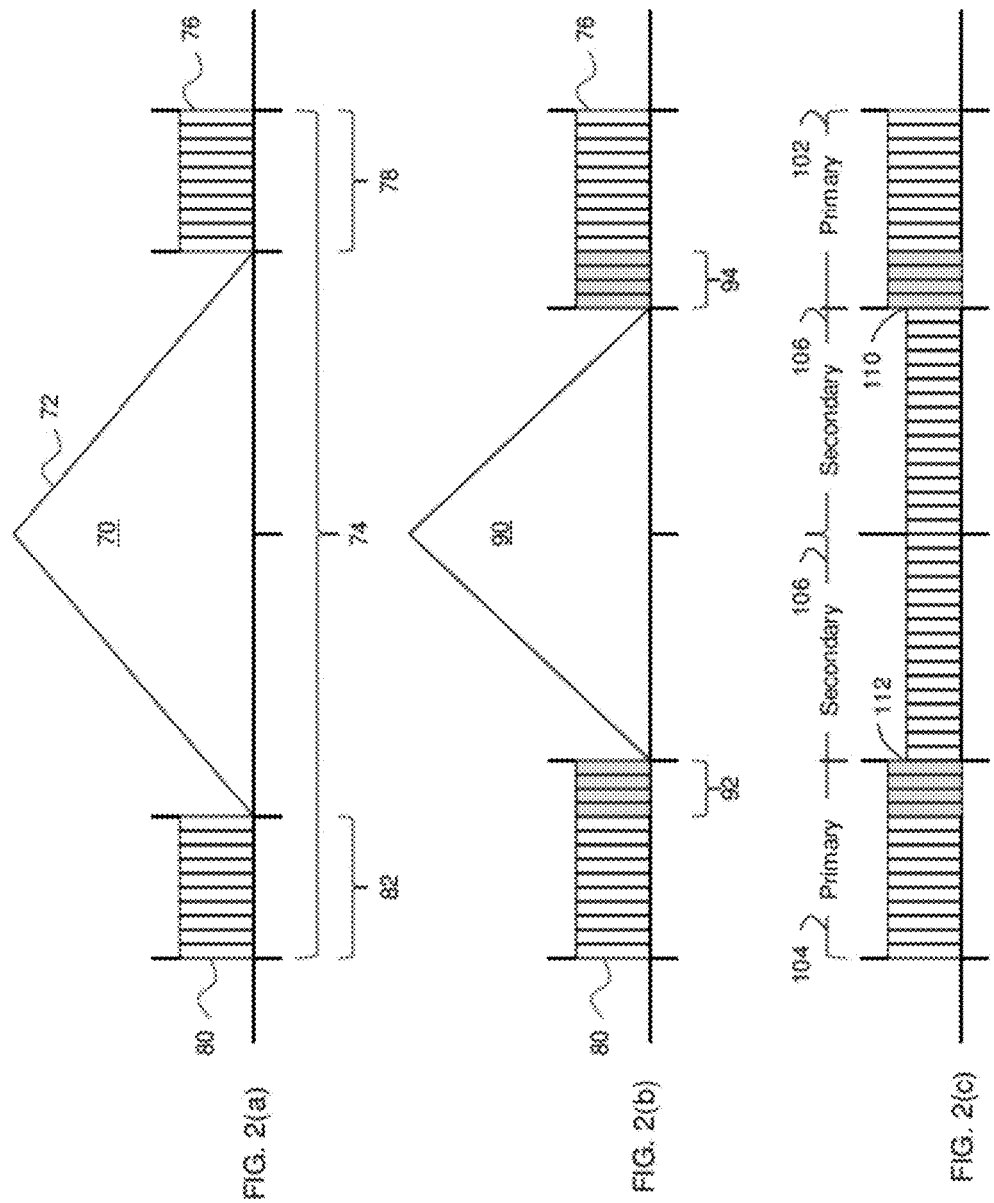
FIG. 2 illustrates schematic representations of a hybrid FM IBOC waveform (top), an extended hybrid FM IBOC waveform (middle), and an all-digital FM IBOC waveform (bottom)

FIG. 2(a) is a schematic representation of a hybrid FM IBOC waveform 70. The waveform includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform includes an analog FM-modulated signal, plus digitally modulated primary main subcarriers. The subcarriers are located at evenly spaced frequency locations. The subcarrier locations can be numbered from −546 to +546 for example. In the waveform of FIG. 2(a), the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

FIG. 2(b) is a schematic representation of an extended hybrid FM IBOC waveform 90. The extended hybrid waveform is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus digitally modulated primary main subcarriers (subcarriers +356 to +546 and −356 to −546 for example) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

FIG. 2(c) is a schematic representation of an all-digital FM IBOC waveform 100. The all-digital waveform is constructed by disabling the analog signal, fully expanding the bandwidth of the primary digital sidebands 102, 104, and adding lower-power secondary sidebands 106, 108 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten secondary main (SM) and four secondary extended (SX) frequency partitions. Unlike the primary sidebands, however, the secondary main frequency partitions are mapped nearer to the channel center with the extended frequency partitions farther from the center.

Each secondary sideband also supports a small secondary protected (SP) region 110, 112 including 12 OFDM subcarriers and reference subcarriers 279 and −279 for example. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each secondary main sideband spans subcarriers 1 through 190 or −1 through −190 for example. The upper secondary extended sideband includes subcarriers 191 through 266, and the upper secondary protected sideband includes subcarriers 267 through 278, plus additional reference subcarrier 279. The lower secondary extended sideband includes subcarriers −191 through −266, and the lower secondary protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of the four may be selected for application to the secondary sidebands.

In each of the waveforms, the digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM signal in the hybrid waveform. The power level of each sideband is appreciably below the total power in the analog FM signal. The analog signal may be monophonic or stereo, and may include subsidiary communications authorization (SCA) channels.

In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband.

In the all-digital waveform, the analog signal is removed and the bandwidth of the primary digital sidebands is fully extended as in the extended hybrid waveform. In addition, this waveform allows lower-power digital secondary sidebands to be transmitted in the spectrum vacated by the analog FM signal.

Figure 3:
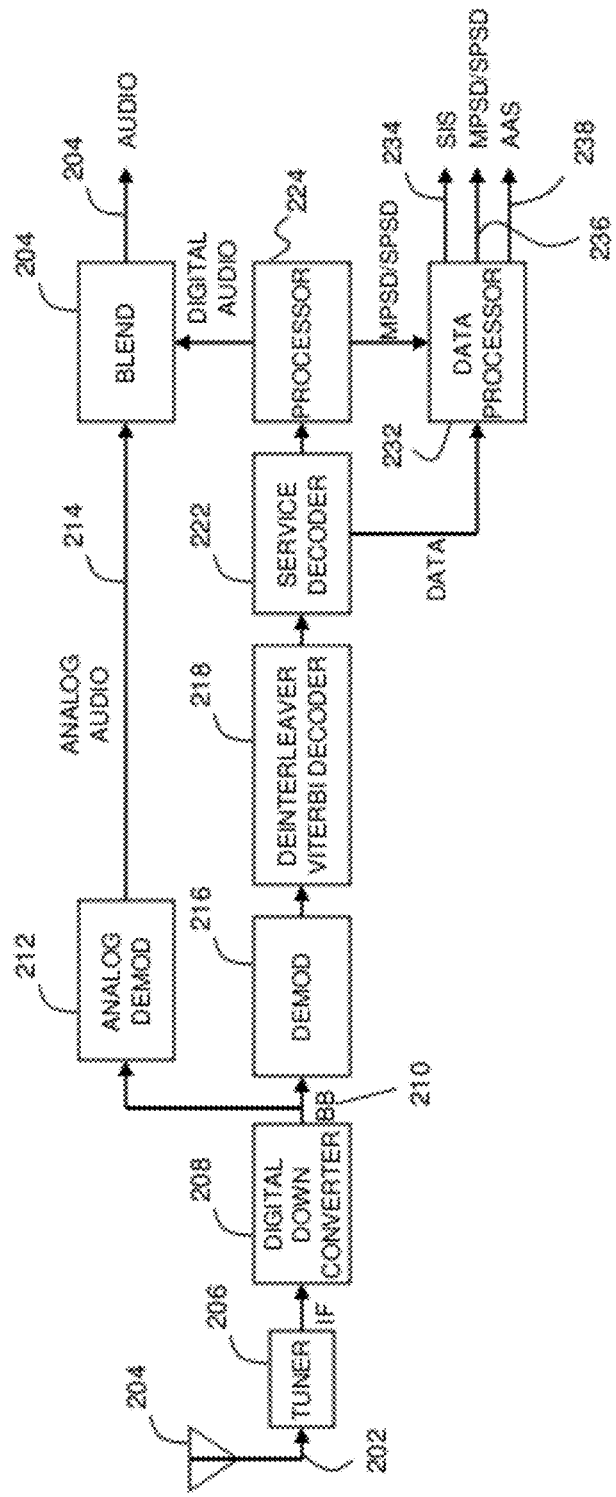
FIG. 3 is a functional block diagram of an AM IBOC DAB receiver.

FIG. 3 is a simplified functional block diagram of an IBOC DAB receiver 200. The receiver includes an input 202 connected to an antenna 204, a tuner or front end 206, and a digital down converter 208 for producing a baseband signal on line 210. An analog demodulator 212 demodulates the analog modulated portion of the baseband signal to produce an analog audio signal on line 214. A digital demodulator 216 extracts and demodulates the digitally modulated portion of the baseband signal. Then the digital signal is deinterleaved and decoded by a combination deinterleaver/Viterbi decoder 218. A service demodulator 222 separates main and supplemental program signals from data signals. A processor 224 processes the program signals to produce a digital audio signal on line 226. The analog and main digital audio signals are blended as shown in block 228, or a supplemental digital audio signal is passed through, to produce an audio output on line 230. A data processor 232 processes the data signals and produces data output signals on lines 234, 236 and 238. The data signals can include, for example, a station information service (SIS), main program service data (MPSD), supplemental program service data (SPSD), and one or more auxiliary application services (AAS).

Figure 4:
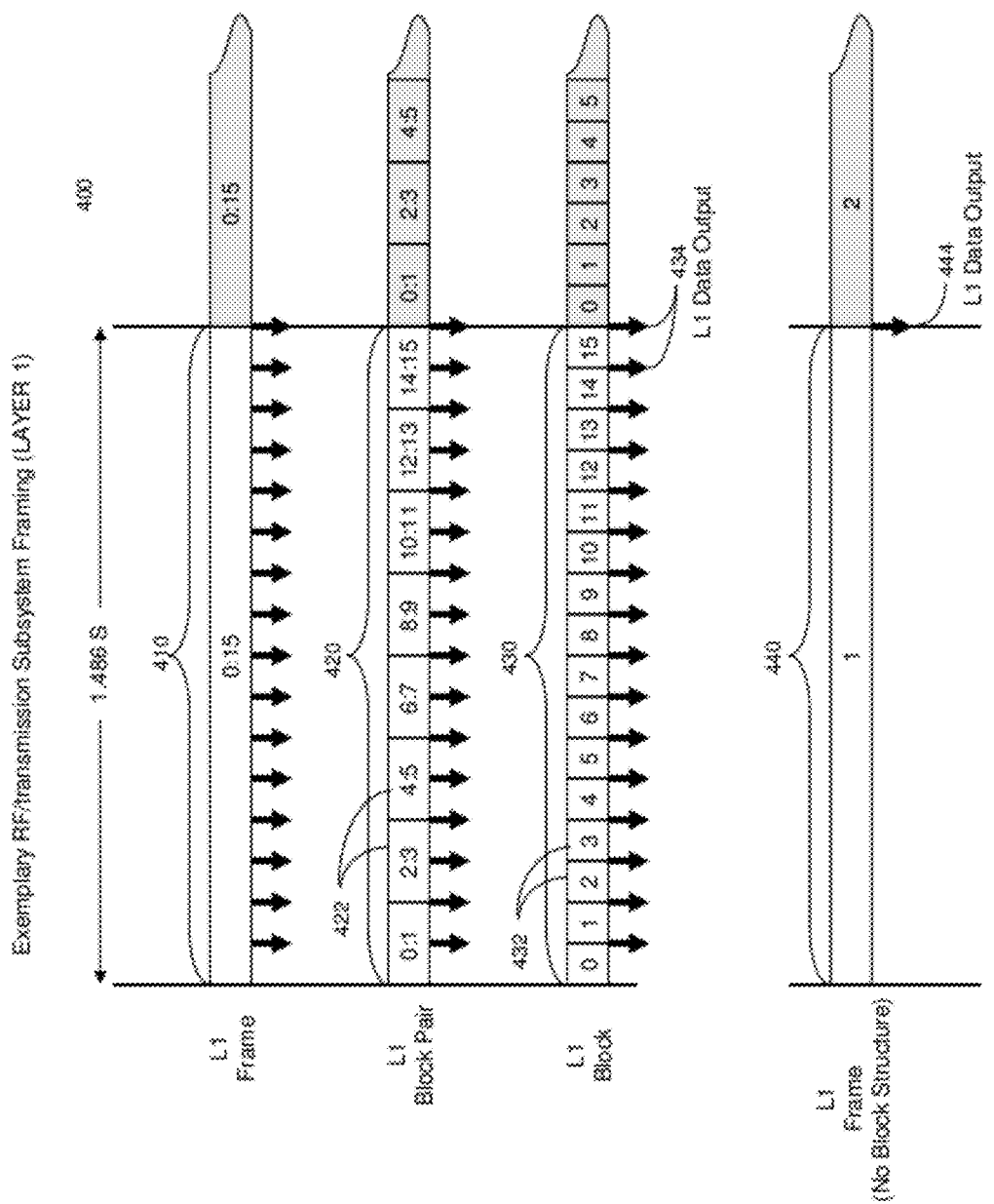
FIG. 4 is a diagram illustrating an RF/transmission subsystem framing or Layer 1 (L1) in accordance with the embodiments herein.

The RF/transmission frame timing of a typical DAB waveform is shown in FIG. 4. This framing and associated functions are often referred to as Layer 1 or L1 processing. In this example the L1 frame 410 is set to a transmission frame length of 1.486 seconds. The L1 frame may be further subdivided into equal size blocks 432 such that 16 blocks comprise one L1 frame diagram 430. The blocks 432 are each assigned a block count ranging from 0 through 15 as shown in L1 frame diagram 430. The blocks 432 may be grouped into block pairs 422 to facilitate alignment and transfer of data units as shown in L1 frame diagram 420. Each block pair 422 may be assigned a block range such as 2:3 which is based on the block counts assigned to the block pair. Alternatively, the L1 frame may have a different underlying block structure or no underlying block structure as shown in frame diagram 440. Receivers must synchronize to the frame structure in order to deinterleave, decode and demultiplex the transmit data stream. For each service multiplexed in the stream, the grade of service can be configured for transfer, latency and robustness based on setting the channel code rate, interleaver depth, diversity delay and spectral mapping. Transfer defines the throughput of the service in terms of transfer frame size in bits and transfer frame rate in Hz. Block oriented operations of Layer 1, which may include interleaving, coding or other operations, may require Layer 1 to process data in discrete transfer frames as opposed to continuous streams. These transfer frames may be conveniently aligned with the Layer 1 framing and transferred at the L1 frame rate, the L1 block pair rate or the L1 block rate. With continued reference to FIG. 4, receivers in synchronization with the transmission framing may output data in bursts 434, as block operations are completed at each block interval or frame interval, as defined by each transfer frame processed. At each L1 block or frame boundary, the receiver may complete deinterleaver and/or decoder block operations on multiple services and thus the L1 data output will contain a multiplex of services extracted from the waveform over the previous block, frame or transfer frame interval. The potential L1 data output points 434 are depicted by downward arrows in frame diagrams 410, 420 and 430. In an alternative L1 frame structure such as 440 with no underlying block structure, the L1 data output 444 may occur only at full frame intervals.

Figure 5:
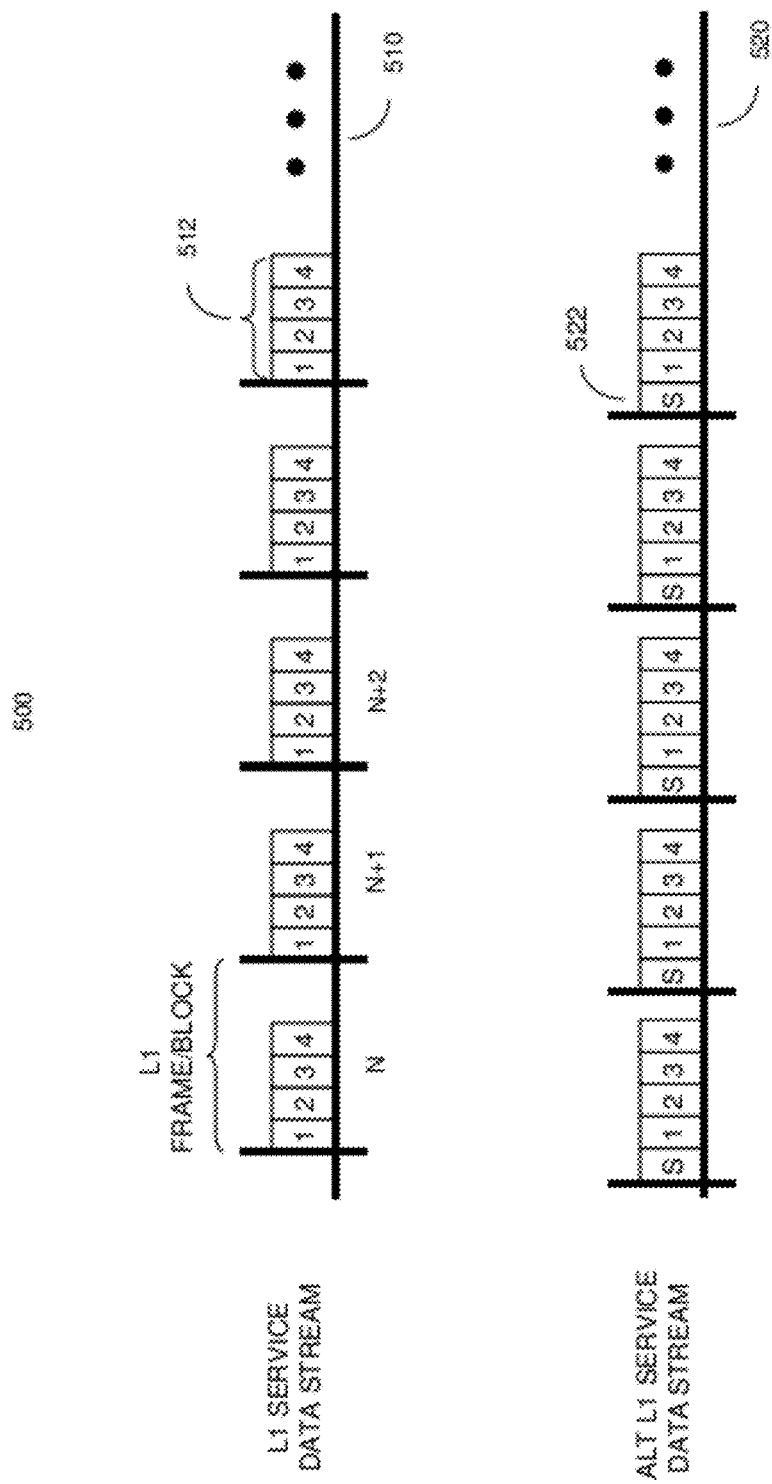
FIG. 5 illustrates exemplary L1 data service streams in accordance with the embodiments.

With reference to FIG. 5, details of the L1 Data Stream 510 are shown. Since the inventive functionality requires multiple services to be extracted from the waveform, the L1 data stream by definition will contain a multiplex of services. Preferably, the services are audio services but optionally could be video, data or any combination of formats. Since individual services will eventually have to be extracted from the multiplexed data bursts, it is necessary to include information to facilitate this later demultiplexing step. This can be accomplished by the addition of a frame structure to the Layer 1 data stream applied by or immediately after the L1 processing unit. The frame structure may typically include a header for each service which is comprised of at least a service identifier and a length of data field. Optionally, the header could contain song and artist data, channel data, reception quality data, audio compression format and bit rate data, encryption data and/or L1 frame or block data. For example in FIG. 5, the individual service data packets 512 labeled 1, 2, 3 and 4 each include a header identifying the service and the associated payload data length. This enables a processing unit to extract a specific service from a memory partition containing data for frame block N by first examining the header for data packet 1 to determine if its service identifier matches the desired service and if so, to extract the specified payload immediately following the header. If no match, the processing unit then examines the header for data packet number 2, which immediately follows data packet 1. The process continues until either a match is found or all data packet headers in the memory partition have been examined. The processing unit then repeats the procedure in the memory partition for frame block N+1. Alternatively, the individual service data packets 1, 2, 3 and 4 could be organized into a single packet, where the packet header would contain a list of the service identifiers and associated payload lengths. In one implementation the service identifiers in the header could be placed in the same order as the following blocks of payload data, enabling a processing unit to determine the start location of the desired payload by totaling the payload service lengths occurring prior to the desired service in the payload field. The payload data for an individual service packet includes the data for that service recovered by the L1 processing step during the previous block, frame or transfer frame period.

This data may be in the form of a protocol data unit(s) (PDU) or a partial PDU where a PDU is defined as an encapsulated data unit (e.g. Reed-Solomon Codeword) produced by a layer if the protocol stack or the data may be in the form of data units without encapsulation, such as a portion of a compressed stream of audio packets suitable for direct application to an audio decoder or data intended for a data processing unit. The data may or may not be encrypted. Encryption and/or decryption stages may be inserted prior to the L1 data stream output as required by the security needs of the receiver system.

Continuing with FIG. 5, an alternate L1 Data Stream 520 is shown including System Data packets 522. The system data may include Station Information Service (SIS), Program Service Data (PSD) and other information such as the channel name of the primary and supplemental services, the song/artist names of the services, reference identifiers, service categories and IDs, audio compression format and bit rate data, reception quality info, encryption info and/or L1 frame or block numbers. This data may be transferred to the controller/memory manager unit via the L1 data stream or through a separate communications path with the L1 processing unit.

For each audio service contained in the L1 transmission, the audio is streamed continuously in compressed format. At the audio source for each service, some portions of the audio may originate as individual uncompressed audio files and other portions may include live audio segments. These audio sources are typically sequenced into a single stream of audio and then fed to an audio compression algorithm which outputs a continuous constant bit-rate compressed audio stream. This resultant stream may or may not contain the start and stop points of the individual audio files applied to the input of the compressor. Program service data (PSD) containing the name of the audio segment may be transmitted along with the compressed stream and/or embedded in the stream in the form of an ID3 tag. Preferably, to avoid parsing all streams simultaneously received in a multi-channel receiver, the PSD data is transmitted along with the compressed stream and may be sent in close synchronization with the file transitions such that the first transmission of the PSD occurs in alignment with the file transition, so that receivers may display the name and artist of a new song at the same time the new song audio starts. To reduce errors in PSD alignment with the audio stream due to PSD data transmission latency, a separate data channel with a minimum fixed bandwidth may be dedicated for PSD transmissions. Subsequent PSD transmissions are sent, as bandwidth permits, to enable receivers tuning in to the channel after the song start and thus missing the initial PSD transmission to still display the song data. For receivers which store songs into memory, the PSD data may be used to demark where the song data starts and ends in the continuous audio stream. For example, a receiver will open a new audio file, on the first occurrence of a new artist/song (or reference identifier) in the PSD, and begin storing audio data units to the file. When a different artist/song appears in the PSD, storage of the audio data ends and the file is complete. At this time a new file may be opened to store the second artist/song's audio data. This process may repeat as required by the audio storage application. Receivers which operate in this manner often deploy non-volatile memory and a file management system using a file allocation table (FAT) to efficiently manage storage and deletion of files. Unfortunately, these file management systems use substantial processor memory and MIPS which require larger processors and increased receiver cost. An example of this type of receiver storage system can be found in US Patent Application 2009/0070597 entitled "Method and Apparatus for Store and Replay Functions in a Digital Radio Broadcasting Receiver". The processing requirements and complexity for the memory management in these receivers increase almost linearly for each additional audio service simultaneously stored, as for each service the audio data must be separately extracted or demultiplexed from the L1 service data stream and moved to a separate file location. U.S. Patent Application 2009/0320075 (PA075) entitled "Method and Apparatus for Multiplexing Audio Program Channels from one or more Received Broadcast Streams to Provide a Playlist Style Listening Experience to Users" avoids the file management system using a file allocation table by deploying circular buffers to store the audio streams. While circular buffer approach reduces the file management overhead, as shown in PA 2009/0320075 FIG. 16, processing and complexity of the managing the buffers increase with each additional channel simultaneously received. That is, for each channel received a separate circular buffer must be allocated and each channel must be separately extracted or demultiplexed from the L1 service data stream and moved to the circular buffer. This requires substantial processing complexity and bookkeeping as for each individual service buffer, start locations, stop locations, write pointers, read pointers and other status must be maintained as each respective data packet from the L1 service stream is demultiplexed and transferred to the buffer. In receiver systems where a limited amount of memory is allocated for buffering, the individual buffers must be sized not to exceed the limited buffer memory. If while operating with a given buffer configuration a change in the channels being simultaneously received occurs, such as an increase in channels or services being received, the buffers may need to be reconfigured if not initially sized smaller in anticipation of maximum channel reception. Since buffer reconfiguration may result in an undesirable loss of previous data content, and sizing buffers to anticipate a maximum channel reception case may unnecessarily reduce active buffer size when fewer channels are received (e.g. partitioning memory for 12 buffers when only 3 are active reduces potential active buffer capacity by 75%), this buffer approach is not optimal for dynamic conditions.

In order to keep receiver cost and complexity down for multichannel storage receivers, a simplified solution to the buffering function is required. Since the inventive receiver described herein is intended to output a single audio channel, some of the memory management steps used by previous multichannel receivers may be eliminated, greatly reducing processing overhead, complexity and associated costs. This simplified approach has additional advantages in that each additional service received adds minimal memory management complexity and the fixed circular buffer memory is optimally used for all configurations including running changes in the number of channels simultaneously received. Since in a preferred embodiment of the invention, only one audio channel is output at a time, then only one compressed audio channel must be input to the audio decoder function and thus only one channel at a time is required to be demultiplexed from the L1 service stream. This provides a significant simplification, since independent of whether 2 or 16 channels are present on the L1 service data stream, it is only necessary to demultiplex one of the channels present to the audio decoder. The L1 service data stream is transferred substantially in its entirety to a fixed circular buffer.

Figure 6:
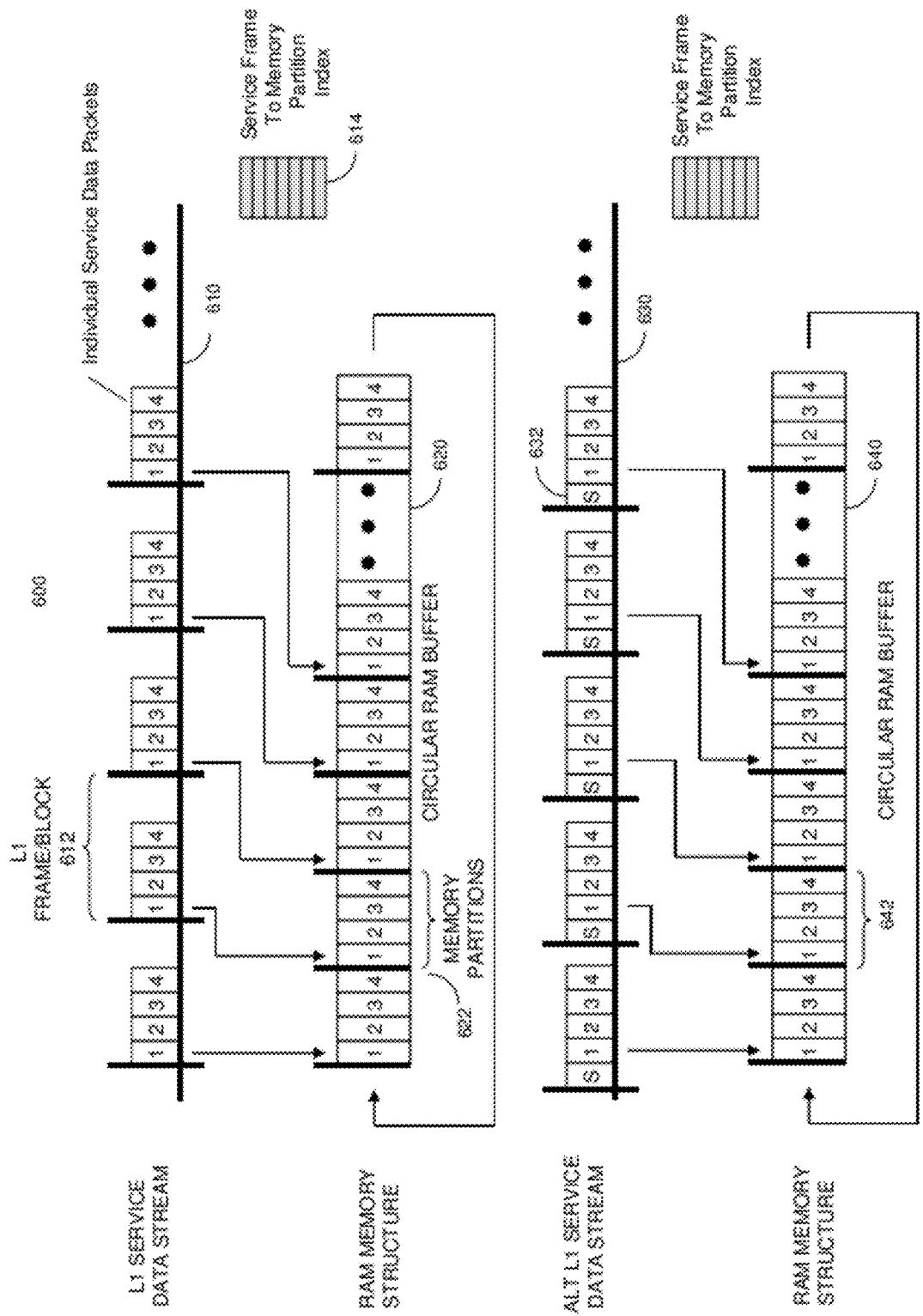
FIG. 6 illustrates the L1 data service streams of FIG. 5 and their interactions with a circular RAM buffer in accordance with the embodiments.

FIG. 6 shows details of the L1 data stream 610, along with mapping of the data stream to a circular RAM memory unit 620. Data contained in each L1 frame or block 612 is transferred sequentially to a memory partition 622 in RAM 620.

When the system data packets 632 are included with the alternate L1 service data stream 630, the system data may be extracted prior to transferring the L1 service stream to RAM 640 as shown in FIG. 6, or optionally transferred to the RAM partitions 642 with its associated service data (not shown). Similarly, other service data packets may be extracted prior to transfer to RAM so that the RAM buffer holds only data potentially needed for later extraction. An index 614 associated with the RAM buffer is used to identify memory partition locations associated with service events such as a change of the song/artist field in the PSD or other events which may include but not limited to changes to the service bit-rate, service audio algorithm, encryption, service status, and buffer status.

In a preferred embodiment, all interactive receivers will allocate a minimum amount of circular RAM buffer to support the interactive features. Size versus performance of the RAM may be determined by computational methods. Ignoring the L1 service stream framing overhead for a simplified example, if a low cost (<$3.00) 256 Mbit DRAM were deployed in the receiver for buffering, and 6 channels are simultaneously received with content segments of 3 minutes average duration and the average channel compressed bitrate is 32 kbps (3 channels at 48 kbps and 3 channels at 16 kbps), the performance parameters would be as follows:

Content Segments Stored=256 Mbit/(32 kbit/s×3 min×60 sec/min)=44

Storage Duration=256 Mbit/(32 kbit/s×6 chan)=1333 sec=22 min

In a preferred embodiment, the number of content segments navigable by the listener would start from zero, when the receiver is first turned on or when the receiver is first tuned to an IBOC channel, and increase with time as the buffer is filled. The buffer is cleared when the listener tunes to a new IBOC channel or when the receiver is powered down. Optionally, receivers may deploy a standby power source to maintain the buffer contents during power down such that when the receiver is powered up on the same station, some navigable segments from the previous power cycle may be immediately available. When reception begins on the IBOC channel with a cleared buffer, after 22 minutes, the buffer would contain approximately 44 navigable content segments which would be continuously refreshed on a FIFO basis. The rate at which the buffer is filled is dependent on the number of simultaneous channels extracted. For example, using the 32 kbps average bitrate, if only 4 channels were simultaneously extracted, the time to fill the buffer increases to 33 minutes. Similarly, if 8 channels were simultaneously extracted, the time to fill the buffer decreases to 17 minutes. Alternatively, if a 512 Mbit memory were deployed, the 8 channels would require 34 minutes to fill the buffer with approximately 88 content segments. As the navigable content segments increase approximately linearly with dwell time on the IBOC channel while the buffer fills, active listeners who frequently navigate content will realize that the benefits of not changing the channel grow with time. This could benefit the broadcaster in terms of average TSL.

Continuing with the example of a receiver deploying a 256 Mbit circular buffer, the buffer is preferably partitioned into memory intervals which are associated with the L1 service stream frames. The memory intervals may be fixed memory blocks such that the L1 service stream output for a given L1 frame or block is contained starting at the beginning of a memory interval and being contained within an integer number of memory intervals.

Figure 7:
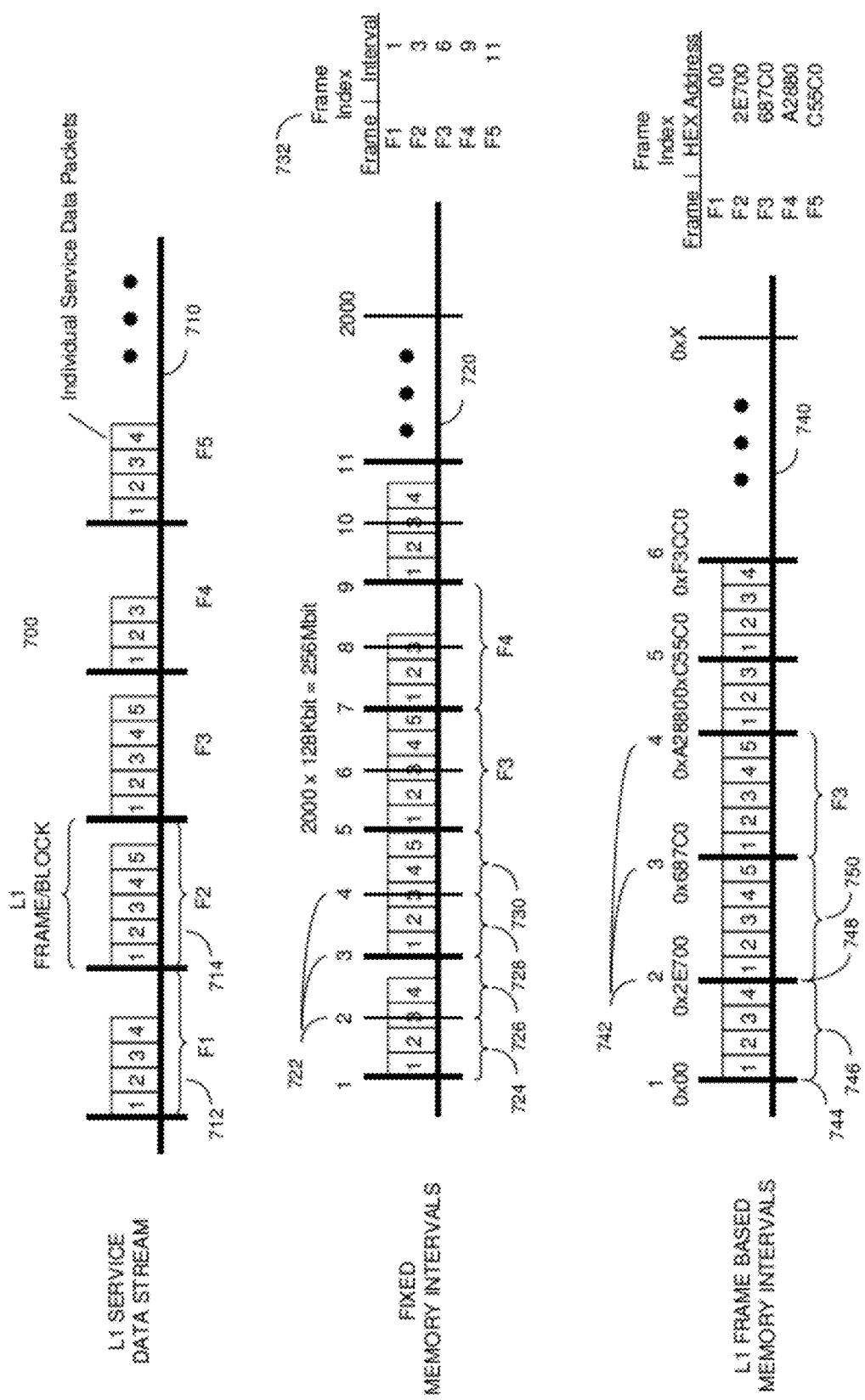
FIG. 7 illustrates an L1 data service stream and corresponding memory intervals in accordance with the embodiments.

For example with reference to FIG. 7, an exemplary L1 service stream 710 is shown along with the associated mapping to a fixed partition 256 Mbit memory 720, where the partitioning 722 is defined by 2000 128 kbit memory intervals. As the frame F1 712 is received on the L1 service stream by the memory manager, it is it is transferred directly to memory starting in interval #1 724. When the transfer is complete, F1 occupies interval #1 724 and a portion of interval #2 726. In the frame index table 732, the frame F1 start location is recorded as interval #1. When the next frame F2 714 is received, it is transferred to the next sequential interval not occupied by the previous frame. In this example, F2 714 is transferred directly to memory starting in interval #3 728. When this transfer is complete, F2 occupies interval #3 728 and interval #4 730. In the frame index table 732, the F2 start location is recorded as interval #3 728. This process continues until the end of the buffer is reached, at which time the operation wraps back to start interval #1 and the previous data, F1 in this example, is overwritten. To compute the starting memory address for any frame, the simple formula "(interval #−1)×128K" is used. By using fixed partitions in the memory, some intervals of the memory are only partially used, reducing memory efficiency. Reducing the size of the memory intervals can improve this inefficiency.

Continuing with FIG. 7, alternatively, memory intervals 742 may be set based on the L1 frame payload as shown in memory map 740. In this approach, when the frame F1 712 is received on the L1 service stream 710 by the memory manager, it is it is transferred directly to memory starting at memory location 0x00 744 (with offset as required). When the transfer is complete, F1 occupies interval #1 746 and in the frame index table 752, the F1 start location is recorded as hex address 0x00. When the next frame F2 714 is received, it is transferred to memory starting at the next byte location not occupied by F1. In this example, F2 is transferred directly to memory starting at memory address 0x2E700 748. When this transfer is complete, F2 occupies interval #2 750. In the frame index table 752, the F2 start address 0x2E700 is recorded. As before, this process continues until the end of the buffer is reached, at which time the operation wraps and overwrites previous data.

Note that the process for both type memory intervals is independent of the number of individual service data packets in the L1 service stream.

The frame index table is used to associate content contained in the streams to memory locations in the circular buffer. The frame index table preferably contained in a separate circular buffer such that when the end of the buffer is reached, older index data which may no longer exist in the L1 service stream buffer is overwritten by the newest data. When the start frame of a content segment in the L1 service stream buffer is overwritten with new data, the corresponding content segment data in the index table buffer is marked as no longer available. The frame index table is populated with the artist and song data contained in the Main Program Service Data (MPSD) and the Supplemental Program Service Data (SPSD). In the receiver, as MPSD and SPSD data is received from the L1 processing unit, the song and artist or commercial fields are recorded into the frame index table sequentially, along with information to enable later extraction of the audio stream from the L1 service stream buffer, such as the associated program number or service ID, the present L1 frame start address or memory interval number being written, along with other data which may be required for playback and contained in either the Index buffer or the L1 service stream buffer, such as the audio service bitrate and decoder type, encryption data or other content related data. While the MPSD and SPSD data are repetitively transmitted in the broadcast, only the first occurrence of the message is recorded into the index table which is received in approximate alignment with the start of the respective program content in the L1 service data stream. As a result, the index table will contain a list of the songs and other content received across the multiple channels as well as the start location, in terms of a start frame memory location in the L1 service stream buffer, for each song received. This list may be made available to listeners with receivers containing an advanced display interface, which may also include commands to play listener selected songs in the list. At the other extreme, very low cost receivers may not display any song or artist information. When the memory manager commences playback of a content segment listed in the frame index table, the frame start address for that content segment is used to begin the extraction process from the L1 service stream buffer. Within the designated frame within the L1 service stream buffer, the individual service data packets are examined and the packet(s) matching the content segment's program number or service ID are transferred to the audio decoder block for further processing and audio decompression. The output of the audio decoder block may then be fed to an A/D converter to generate the analog audio signal for the listener.

Optionally, it may be desirable to enable pause and replay functions to the end user with fixed performance parameters, such a pause function which provides up to 15 minutes of pause. Such performance cannot be guaranteed with the L1 service stream buffer alone. For example, if the L1 service stream buffer is operating with 30 minutes duration, a content segment being played back which is located within 1 minute from the start of the buffer could be paused for approximately 29 minutes before being overwritten by new data. However, an older content segment being played back which is 29 minutes away from the start of the L1 service stream buffer could only be paused for approximately 1 minute before being overwritten by new data. To enable pause and replay functions in a manner which enables consistent pause time independent of where content is located within the L1 service stream buffer, the buffer memory may be split into two buffer sections, where the first section contains the L1 service stream buffer and the second section contains the pause and replay buffer. Since the pause and replay buffer would normally contain only a single stream at a time, it typically would be sized smaller than the L1 service stream buffer for similar time intervals. One simple implementation of the pause/replay buffer could be implemented by routing the stream of audio segments extracted from the L1 service stream to both the audio decoder and the pause/replay buffer. When the pause button is pressed, data streamed to the audio processor would stop, preferably on a L1 frame boundary, along with audio decoder processing while the audio segment being extracted would continue to the pause/replay buffer. If the pause period is extended beyond the completion of the present audio segment extraction from the L1 service stream buffer, extraction to the pause/replay buffer could continue with sequential audio segments extracted from same program number or service ID. In this implementation, if the user was listening to a talk show segment when the pause button was pressed, when listening resumed, sequential segments of the show, as opposed to other service segments, would be available from the pause/replay buffer on a time shifted basis. Once the user resumes listening from the pause mode, the data is now streamed from the pause/replay buffer to the audio decoder, starting from the frame in which the pause mode was entered and audio decoder processing would restart. At this time the audio stream is first extracted from the L1 service stream buffer to the pause/replay buffer and then from a time shifted position in the pause/replay buffer to the audio decoder. While under a static multi-channel reception configuration, data extraction from the L1 service stream buffer to the pause/replay buffer would commence at a rate consistent with the real time playback needs of the audio decoder, whether or not the pause mode is engaged. Here, the position of the data extraction pointer maintains a consistent time interval ahead of the new incoming data pointer thus ensuring the data segment actively being extracted will not be overwritten by new incoming data. Under conditions where an increase in the number of simultaneously received channels or an increase of bit rate on an existing channel occurs, data written to the L1 service stream buffer could cause the write pointer to overtake the position of the data extraction pointer, resulting in a loss of the present output segment. These conditions can be anticipated and various remedies are available, such as only permitting content segment extractions which have a suitable time buffer to the write pointer or enabling data transfer from the L1 service stream buffer to the pause/replay buffer at faster than real time speeds during periods of encroachment by the write pointer while extracting real time data for the audio decoder from the pause/replay buffer. Continuing with the pause/replay buffer example, once the user resumes listening from the pause mode and data is being streamed from the pause/replay buffer to the audio decoder, pressing the next content segment navigation control would shift data extraction to the start of the next content segment in the replay buffer. If a new content segment is not available in the replay buffer, data streaming to the audio decoder shifts from the replay buffer back to the L1 service stream buffer with a new content segment determined by the content manager. The pause/replay buffer is a circular buffer which is managed similar to the L1 service stream buffer in that it has an associated index which captures the PSD data associated with the content segments along with the memory address information necessary to extract the content segment.

Figure 8:
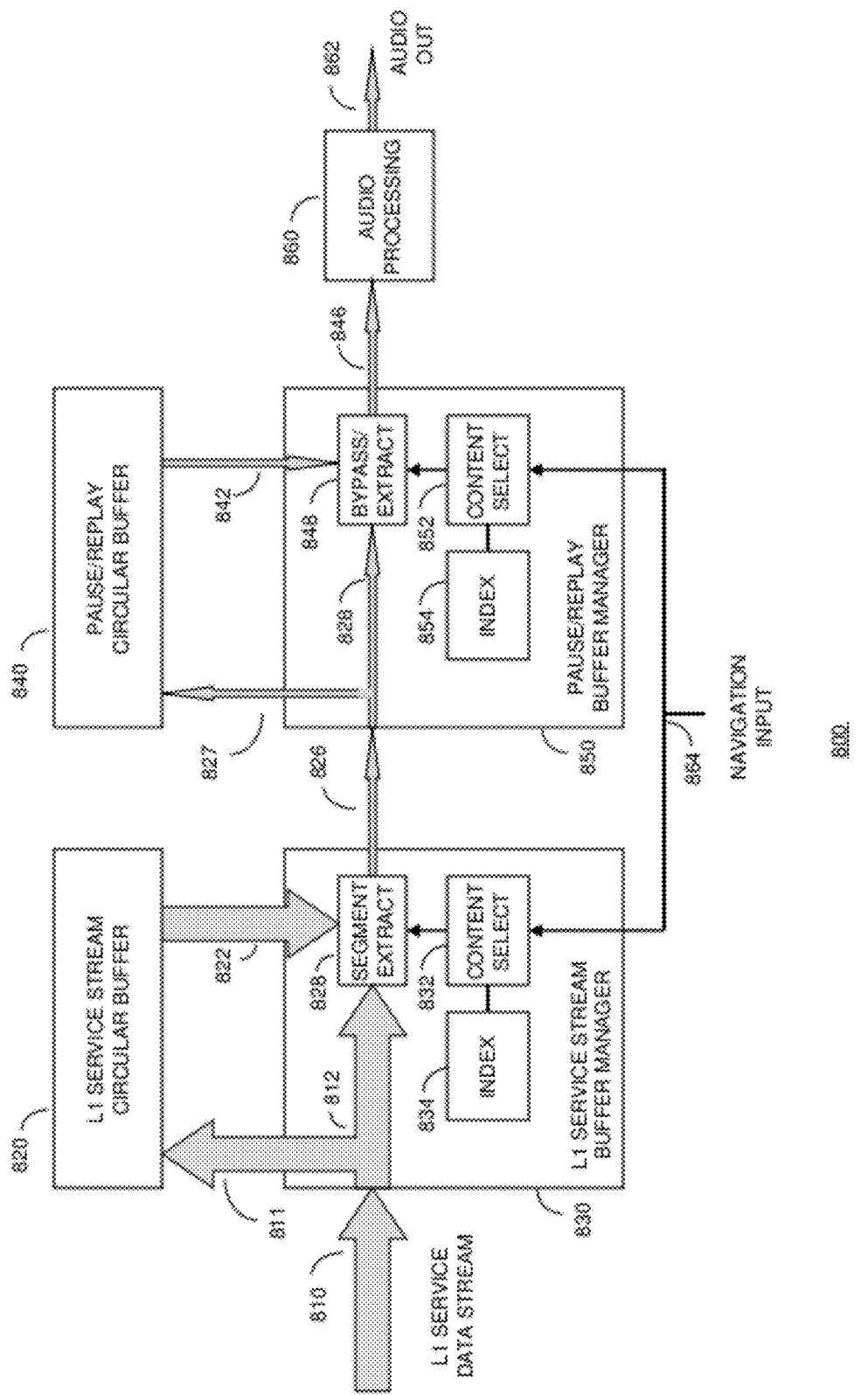
FIG. 8 illustrates the L1 data service stream and corresponding L1 service stream buffer and Pause/Replay buffer using circular RAM buffers in accordance with the embodiments.

FIG. 8 shows an exemplary data flow block diagram from the L1 service data stream through to the audio output. The L1 service data stream is applied to the L1 service stream buffer management block 830 through path 810. Buffer management block 830 then transfers the L1 stream to the L1 service stream circular buffer 820 on a continuous basis (assuming signal availability) through path 811 while also making the stream available to audio segment extractor block 828 through path 812. The audio segment extractor block 828 initially extracts an individual segment stream from the L1 service data stream through path 812 and later, under control from the content selection controller 832, extracts individual audio segments from the L1 service stream circular buffer 820 through path 822. Content selection controller block 832 has access to L1 service stream circular buffer index data 834 to facilitate segment extraction from 820. The extracted audio segment stream is output at path 826 to pause/replay buffer manager 850. Pause/replay buffer manager 850 then transfers the extracted audio segment stream to the pause/replay circular buffer 840 on a continuous basis through path 827 while also making the stream available to pause/replay buffer bypass or extract block 848 through path 828. The pause/replay bypass/extract block 848 initially bypasses the pause/replay buffer 840 and routes the extracted audio segment stream on path 828 directly through to the audio processing block 860 on path 846. Under control from content select block 852, bypass/extract block 848 will halt output of the audio segment output stream on path 846. Also under control from content select block 852, bypass/extract block 848 may resume output of the extracted audio segment stream on path 846 from the pause/replay buffer 840 on path 842. Under further control from content select block 852, bypass/extract block 848 may switch sourcing output path 846 from pause/replay buffer 840 on path 842 back to path 828 bypassing the pause/replay buffer once again. Content select block 852 has access to pause/replay circular buffer index data 854 to facilitate segment extraction from 840. Audio processing block 860 receives the extracted audio segment stream on path 846, processes the stream which may require de-encapsulation and error correction steps before audio decoding, and outputs uncompressed digital audio on path 862. Navigation input from listener controls, such as pause, play, next segment and previous segment, is input at 864 to both the L1 service select stream content selection controller 832 and the pause/replay content selection controller 852 in order to coordinate data flow through the buffer management system 800.

In one of the embodiments, the listener is enabled to navigate and consume buffered content in between commercial segments. Herein, commercial segments imply advertiser paid segments, certain DJ segments, station ID segments and any other segments in which the broadcaster assigns a priority transfer to the output stream. Commercial segments received in the L1 service stream buffer are played back to the listener on a time shifted basis, such that when a commercial segment is received, a flag is set to play the commercial immediately upon completion of the present content segment being played or the next content navigation control command, whichever occurs first. When the commercial is played, the content navigation controls may be disabled to ensure the commercial is delivered to the listener. The presence of a commercial segment may be signaled to the receiver via the program service data. Additional fields in the program service data may be used to control the receiver action when a commercial is received. For example, the PSD may contain a content control field to specify the timeshift priority of the received content segment, as described in the table below.

|  | Content Control Field (2 bits) | |
| --- | --- | --- |
| Timeshift Priority | B0 | B1 |
| No timeshift priority | 0 | 0 |
| Priority 2 timeshift | 0 | 1 |
| Priority 1 urgent timeshift | 1 | 0 |
| Priority 0 Real Time | 1 | 1 |

According to the table, the Timeshift Content Control Field could consist of 2 bits with which to specify the priority. A setting of no priority could be used for songs and DJ chatter which may or may not make it to the output stream depending on user navigation of the content. Priority 2 timeshift could be applied to commercials or special news updates, which indicates to the receiver to play the commercial at the next content break. Priority 2 segments are played to the listener in the order received. Priority 1 timeshift could be used for important traffic news or dangerous weather warnings which would be played ahead of any priority 2 segments held in the que. The Priority 0 option could be used to tell the receiver to immediately halt timeshifted playback and return to the live stream for an urgent bulletin or a message from the emergency broadcast system.

Additionally, the PSD may contain a content control field to specify the listener navigation capabilities of the receiver while playing back a content segment. One exemplary embodiment of this control field is shown in the table below.

| | Content Control Field (2 bits) | |
|---|---|---|
| Navigation | B0 | B1 |
| Content navigation enabled | 0 | 0 |
| Content navigation disabled | 0 | 1 |
| Content navigation disabled - conditional | 1 | 0 |
| Content navigation disabled for $1^{st}$ 15 seconds | 1 | 1 |

With reference to the content control field navigation table, the content navigation enabled bits could be sent in the PSD for songs and DJ chatter during which the listener is enabled to use the navigation controls to skip to a different content segment. The content navigation disabled bits could be sent in the PSD for commercial segments or DJ segments including paid promotions for which the receiver would block content navigation for the duration the segment is played back. When the content navigation disabled bits are used, after the content segment is played the receiver could flag the content in memory such that the segment is not replayed with the navigation controls. Alternatively, the content navigation disabled-conditional bits could be sent in the PSD for commercial segments. In this case, the receiver would block content navigation the first time the content segment is played and enable content navigation during any replay of the segment. Another option is to set the content navigation disabled for the first 15 seconds bits in the PSD data, which for example would enable the listener to navigate away from a 30 second commercial after the first 15 seconds. This would enable the listener to either listen to the whole commercial if interested or navigate to a new segment. Note that when listener's content navigation capability is disabled, this only applies to navigation of the buffered content from the broadcast and does not block the user from changing the channel and tuning into a different frequency. However, since in a preferred embodiment changing the channel clears the navigable content segments built up in the L1 buffer over time, the listener may opt to stay on the channel. In this regard, an indicator such as a fuel gauge illustrating the use of the circular buffer or a segment count or song count indicating the number of segments stored in the (temporary) circular buffer can provide a listener with visual feedback and thereby encourage the listener to stay on the channel if they want a buffer of navigable content. An additional indicator can be provided to show whether or not the station's system configuration supports navigation control.

Another level of content navigation control may be applied at the global level (applicable to all content segments with a specific classification, such as commercials, on that IBOC channel) with control fields in the station information service data. Here, the content control fields described for the PSD data may be applied at a global level and/or applied with the PSD control field to further control navigation capabilities. One application of navigation control at the global level could include a field that enables navigation controls commercials repeated earlier in the reception interval. For example, commercials may broadcast during the busy hour to enable listeners to receive the commercial content at the beginning of the hour and the rebroadcast later in the busy hour to enable other listeners tuning in later in the busy hour to also receive the commercial message. Unfortunately, loyal listeners who tune in at the beginning of the busy hour could be exposed to a repeat of the commercial later in the busy hour. The global content navigation control field could instruct the receiver to enable full navigation of repeat commercial segments if the repeat occurs within a specified time interval. Identification of repeat commercials could be through matching PSD fields, such as associated display text or a separate ID number which could optionally designate a specific advertiser to enabling bypass of different commercials from the same advertiser. This setting would enable loyal listeners to skip repeat commercials with the navigation controls while still ensuring the commercial content is delivered at least once (without skipping) to each listener.

A further level of content navigation control could be enabled with the use of addressable receivers. Here, the broadcaster could enable individual receivers to ignore navigation restrictions in the content control field in exchange for a service fee. This functionality could be enabled in the receiver by broadcasting secure messages in a separate authorization data stream.

In general, the content navigation control functionality may be tailored by the broadcaster in order to optimize listenership and station revenue.

Figure 9:
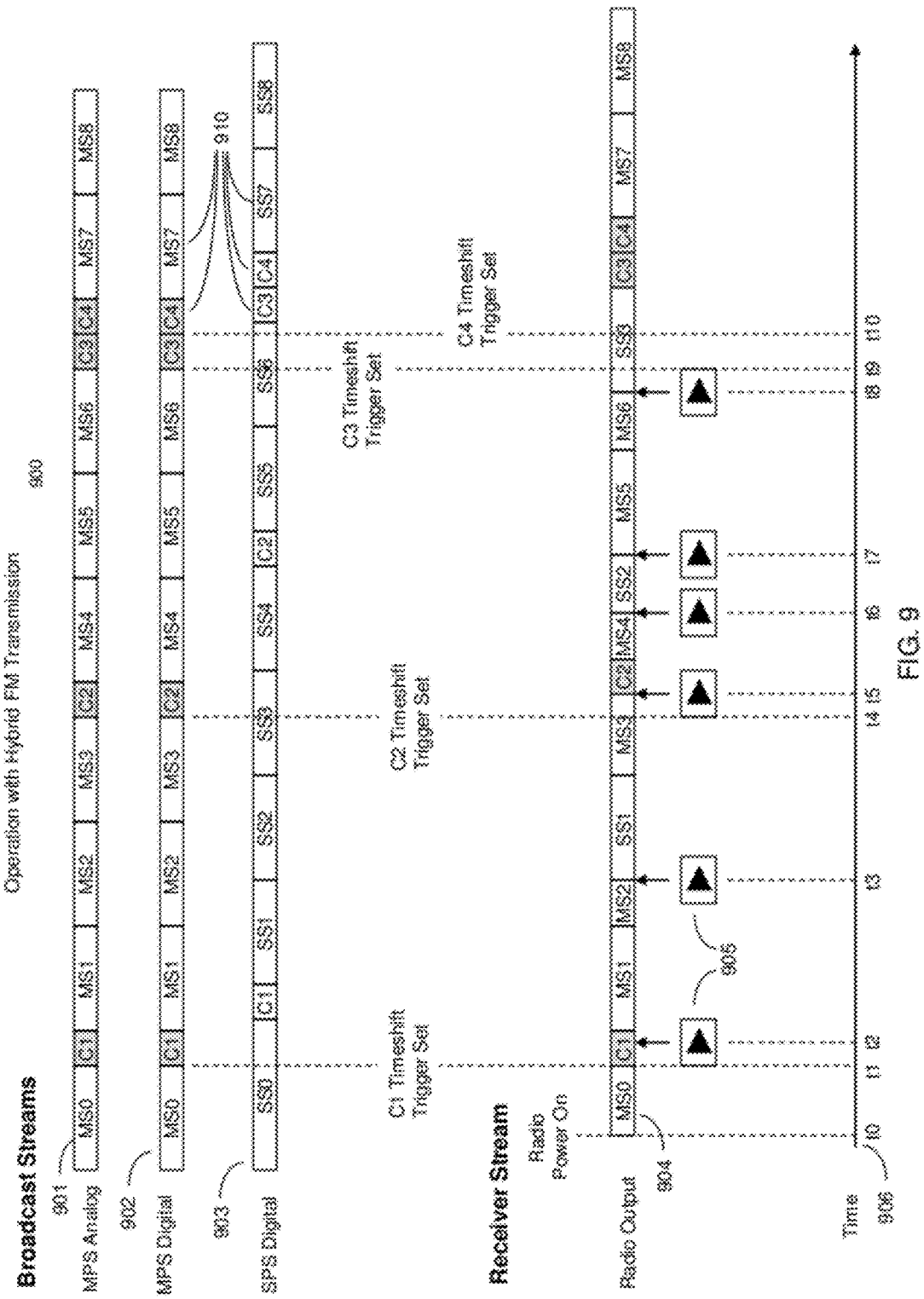
FIG. 9 illustrates analog, digital, and supplemental broadcast streams in operation with a hybrid FM transmission and a corresponding receiver stream in accordance with the embodiments.

FIG. 9 provides an example of how the receiver output audio stream may be assembled through the combination of content segments contained in the primary stream and one supplementary stream along with listener navigation control. This example uses global content control settings of priority 2 timeshift with navigation disabled for commercials and no timeshift priority with navigation enabled for all other content. While this example uses one supplementary stream for simplicity, it is to be understood that embodiments with more than 10 supplementary streams are anticipated. Referring to FIG. 9 in the context of the IBOC waveform, the main program analog broadcast stream 901 is shown at top along with the main program digital stream 902, which replicates the analog stream in digital format, and the supplementary program digital stream 903. Below the broadcast streams 901, 902 and 903 is the receiver stream 904. The streams are shown in approximate time alignment with time increasing from left to right as shown on the time axis 906 at bottom. Below receiver stream 904 are time aligned "next segment" navigation control key presses 905 by the listener which designate times at which the listener wishes to jump to a new content segment. In a simple implementation, the navigation functionality could be limited to only the "next segment" navigation control key. Other navigation control keys supported include "previous segment" key which can restart the present segment or restart the previous segment and the "pause segment" key which can pause and restart the audio stream without loss of content. Each of the streams is composed of a series of content segments 910 versus time. As described earlier, the content segments here are defined by the timing of the PSD messages, although alternate methods such as stream embedded tags may be used. Content segments C1, C2, C3 and C4 represent commercials in the broadcast stream. Content segment MS1 implies Main Service Song #1, MS2 implies Main Service Song #2 and so on. Content segment SS1 implies Supplementary Service song #1, SS2 implies Supplementary Service Song #2 and so on. Referring now to receiver stream 904, upon radio power on at time t0, or upon the radio being tuned to the IBOC channel, the radio begins outputting the live main program audio MS0 with minimum or no delay while loading digital streams 902 and 903 into the L1 service stream buffer. At time t1 main program audio commercial C1 starts and the C1 timeshift trigger is set. Since at this time there is no timeshift in the output audio, C1 immediately follows MS0 in the output stream with no timeshift required. At time t2 the user attempts to navigate to the next content segment while the commercial C1 is playing. This action is blocked for the duration of the commercial is playing based on the global content control settings specified in the SIS data. Note also that a user indication on the display indicating the navigation controls are inactive would normally stop the listener form attempting to navigate during the commercial. The user indication can be text, a LED, an icon or even a use of a backlight such as a red backlight to indicate an inactive navigation control. After the commercial, MS2 plays in its entirety followed by MS3. During MS2, at time t3 the listener decides to navigate to a different content segment. The output stream is switched to supplementary song SS1, which is the first new song in the L1 service stream buffer. At this time t3 forward the output stream is delayed from the live broadcast streams. After song SS1 is complete the output stream switches to song MS3. Note that both MS3 and SS2 were available at the end of SS1 in the output stream. The selection to play MS3 is a function of the content selection algorithm which in this case is set to prioritize the output of stored segments in order of MPS, SPS1, SPS2, SPS3, and so on. Alternate algorithms based on stream rotation on new segment commands only, FIFO or other rules are possible and may be stored in the receiver as presets and specified by the broadcaster in the SIS data. Songs played are flagged in the L1 frame index table where the flag may also include a modulo playback sequence counter which may be used as a song sequencer for hyperactive listeners who may navigate repeatedly through the L1 service stream buffer. During playback of MS3 at the radio output, at time t4 the start of commercial C2 sets the timeshift trigger. Later and still during playback of MS3, the listener decides to navigate to the next content segment at time t5. Since commercial C2 has its timeshift trigger set, it is played next in the output stream. Note that if the listener had decided not to navigate, then C2 would have played when MS3 was complete. Upon completion of C2, MS4 is sent to the output stream. During MS4 at time t6, the listener decides to navigate to the next content segment. At that time the output is switched to song SS2. During playback of SS2, the listener at time t7 again decides to navigate to a new content segment. At that time MS5 is output. MS5 is output in its entirety and followed by MS6. During MS6, the listener again decides to navigate to a new content segment. At that time the output is switched to song SS3. During playback of SS3, the start of commercials C3 and C4 from stream 902 are received which set their respective timeshift triggers. Upon completion of SS3, commercials C3 and C4 are played in the order received. In this example the listener was tuned to the MPS audio stream when navigation started and only commercial content from that stream was used to set timeshift triggers. Commercial content, if any, on the supplementary stream or streams the listener is not tuned to, is ignored. Alternatively, if the user was tuned to a supplementary stream when navigation started, commercial content from that supplementary stream would be used to set timeshift triggers and commercial content on other streams the listener is not tuned to, including the MPS stream, is ignored. In this approach the receiver avoids potential channel branding confusion and functions to provide additional non-commercial content to supplement the specific stream the listener selects.

In alternate embodiments, content navigation functionality similar to that achieved with multiple streams could be achieved with a single high speed stream, where high speed is defined here to be two or more times faster than the real time audio compression bit rate, multiple high speed streams or a combination of high speed streams and real time streams. In one example of an alternate embodiment, if audio content was compressed at 32 kbps and streamed over the air at 320 kbps, receivers would receive content at 10 times the real time rate at which it is consumed. This high speed stream could contain commercials along with the selection of content segments available for the listener to navigate. In this embodiment, the receiver would transfer the L1 service stream to the L1 circular buffer as before and enable the listener to navigate content in the buffer. As before, the start of commercial content received into the L1 service stream buffer would set the commercial timeshift trigger and the commercial would play at the next segment break in the output stream. Various measures may be taken to improve the resolution of identifying where the audio segment starts in the stream, such as the addition of a field in the PSD data specifying an offset position in the L1 service stream start frame. As before, the L1 circular buffer may be used in conjunction with a pause/replay buffer to enable pause/replay functionality and/or full access to the L1 buffer without loss of content due to conflicts of the read and write pointers.

Figure 10:
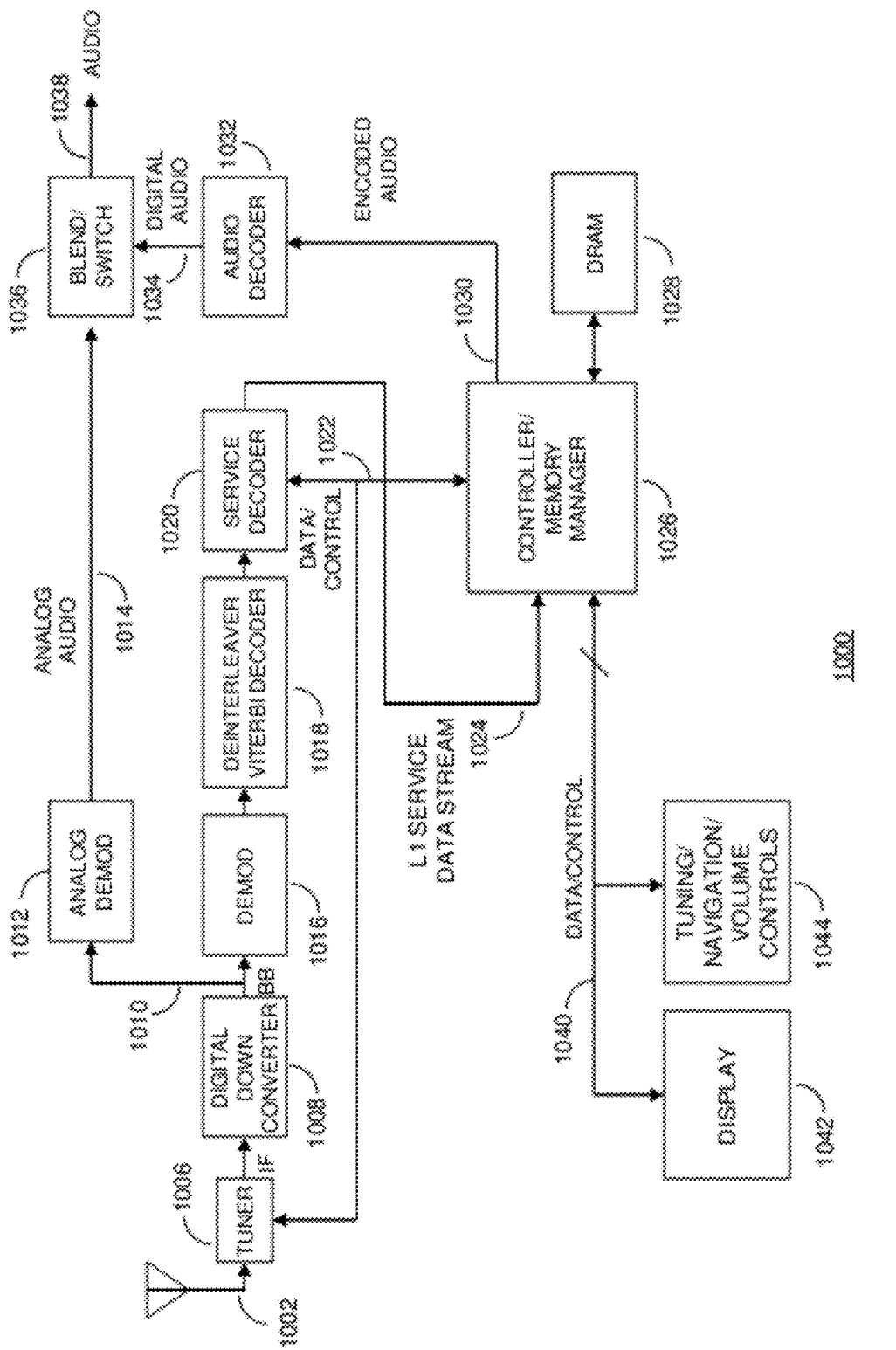
FIG. 10 is a diagram of an IBOC DAB logical protocol stack from the receiver perspective in accordance with the embodiments.

FIG. 10 contains a simplified block diagram capturing the functions of an interactive IBOC DAB receiver 1000. The receiver contains an input 1002 connected to an antenna 1004, a tuner front end 1006, and a digital downconverter 1008 for producing a baseband signal on line 1010. Tuner front end 1006 receives commands from controller/memory manager 1026 on line 1022. An analog demodulator 1012 demodulates the analog modulated portion of the baseband signal to produce an analog audio signal on line 1014. A digital demodulator 1016 extracts and demodulates the digitally modulated portion of the baseband signal. Next, the digital signal is deinterleaved and then decoded by a deinterleaver/Viterbi decoder 1018. Deinterleaver/viterbi decoder block 1018 has the capability to operate on multiple streams embedded in the digital signal in parallel. A service decoder 1020 separates main and supplemental program signals from data signals and may simultaneously extract multiple program signals as requested by controller/memory manager 1026 through data/control interface 1022. Data/control interface 1022 may also be used to transfer other data to controller/memory manager 1026, such as system information and PSD information. Service decoder 1020 may apply a frame structure to the program signals which are output on line 1024, also referred to as the L1 service data stream. Controller/memory manager 1026 receives program signals on line 1024 and routes them to a circular buffer partition in DRAM 1028. DRAM 1028 may be partitioned to accommodate memory for the L1 service stream buffer, a pause/replay buffer, index buffers and other operational memory requirements of controller/memory manager 1026. Controller/memory manager 1026 extracts program signals from DRAM 1028 or directly from line 1024 and then removes any framing and encapsulation data before outputting encoded audio packets on line 1030 to audio decoder 1032. Audio decoder 1032 outputs decoded digital audio on line 1034. The analog and digital audio signals are either blended or switched to analog audio or digital audio as shown in block 1036 to produce an audio output on line 1038. Controller/memory manager 1026 interfaces with receiver display 1042 and tuning/navigation/volume controls 1044 through data/control lines 1040.

In practice, many of the signal processing functions shown in FIG. 10 can be implemented using one or more integrated circuits.

Hundreds of millions of AM and FM analog-only receivers (legacy receivers) have been manufactured and the majority of the listeners today use these receivers. The NRSC-5A IBOC standard enables the broadcasters to transition to digital with little or no impact on legacy receivers, enabling broadcasters to retain their legacy business while expanding service with enhanced digital features. One implementation of digital hybrid technology presently in use by broadcasters, herein referred to as legacy hybrid, is to simulcast the analog broadcast stream in digital format and perhaps to transmit one or more supplemental digital audio channels. Reception of the digital portion of the broadcast is only available to listeners with HD Radio receivers. With appropriate revisions to the NRSC-5A IBOC standard, a fully backward compatible upgrade path for both broadcasters and listeners could be followed. For example, the transition to an interactive hybrid receiver mode with the capabilities disclosed here may require the interactive receiver to be backward compatible with legacy hybrid transmissions. Preferably, broadcasters would have a choice of formatting their hybrid transmissions for legacy hybrid mode, legacy hybrid mode and interactive mode, or interactive mode only. Here, a legacy hybrid mode broadcast enables listeners with legacy hybrid receivers and interactive hybrid receivers to receive the main channel analog and digital audio and to separately tune to digital audio secondary channels, a legacy hybrid mode and interactive mode broadcast enables listeners with legacy hybrid receivers to receive the main channel analog and digital audio and to separately tune to digital audio secondary channels while enabling listeners with interactive receivers to tune to main or secondary channels and engage the content navigation controls, and an interactive mode only broadcast enables listeners with legacy hybrid receivers to receive the main channel analog and digital audio only and interactive receivers to receive the main channel audio and the secondary channel content through the use of navigation controls (or via an automated preview function). For legacy hybrid mode and interactive mode, broadcasters would be required to transmit the configuration to receivers via the SIS data fields and to populate commercial control fields in the PSD data. Population of the commercial control field data is essential to maintain the broadcast integrity of commercial delivery to listeners as this is required to enable interactive receivers to timeshift commercial content with minimum delay from the real time broadcast and to enable blocking of the navigation controls. Interactive hybrid receivers could enable manual tuning to each of the HD channels on a given broadcast frequency and initiate interactive mode when content navigation controls are activated. Once in interactive mode, only commercials from the tuned-in HD channel are injected into the output content stream while non-commercial content from all HD channels is accessible through the content navigation controls. Optionally, certain HD channels or content could be restricted from access by interactive receiver content navigation controls through broadcast station or system information, conditional access, special formatting or other methods. A broadcast formatted for interactive mode only would not support one or more supplemental channels for standalone reception, although main channel digital broadcast would still be received, by legacy hybrid receivers and therefore supplemental channels would not be required to contain certain content such as commercials, news or DJ chatter. Legacy hybrid receivers could be blocked from receiving the supplemental channels via station information fields contained with the broadcast. For the interactive receivers, the supplemental streams could be optimized to enhance the primary channel content. For example a first supplemental stream could contain only top hits in the primary channel genre, a second supplemental stream could contain lesser played content in the primary genre, a third supplemental stream could focus on a particular artist or artists in the primary genre and a fourth supplemental stream could contain comedy skits, enabling an entertaining array of content segments available through the navigation controls. The advantage of the interactive mode only broadcast is the broadcasters programming costs could be reduced, as the supplemental streams could be simple stored-content playlists without production elements. As described previously, commercial content from the primary channel is prioritized for timeshifting to the output stream either at the end of a content segment or when the user initiates a content navigation command. While it is anticipated that interactive HD radio receivers will initially function in hybrid mode, the receivers will also be fully compatible with all-digital AM and/or FM transmissions, similar to legacy hybrid receivers.

It is to be understood that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the machine-readable medium is shown in an example embodiment to be a single medium or two mediums, the term "machine-readable medium" should be taken to include a single medium or multiple media (e.g., a centralized or distributed database, and/or associated caches and servers or one or more buffer memories) that store the one or more sets of instructions or content as the case may be. The term "machine-readable medium" shall also be taken to include any medium that is capable of storing, encoding or carrying a set of instructions for execution by the machine and that cause the machine to perform any one or more of the methodologies of the present disclosure.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the invention has been shown and described with reference to a certain embodiment thereof, it will be understood by those skilled in the art that various changes in form and details may be made therein without departing from the spirit and scope of the invention. Consequently, the scope of the invention should not be limited to the embodiment, but should be defined by the appended claims and equivalents thereof.

What is claimed is:

1. A device comprising:
    a receiver for receiving content containing at least one of commercial content, non-commercial content, or both on multiple broadcast streams contained within a single channel;
    a first circular buffer for storing at least portions of a plurality of the multiple broadcast streams containing the at least one of commercial content, non-commercial content, or both;
    a content selector for producing selected content by selecting portions of the multiple broadcast streams from the first circular buffer;
    a second circular buffer for storing the selected content; and
    a processor coupled to the first circular buffer and the second circular buffer, wherein the processor is operable to:
        selectively navigate among the multiple broadcast streams stored in the first circular buffer and selectively navigate among the at least one of commercial content, non-commercial content, or both stored in the first circular buffer and the second circular buffer.

2. The device of claim 1, wherein
    the processor is further operable to time shift trigger commercial content play based upon the selective navigation, and
    the non-commercial content comprises a plurality of songs.

3. The device of claim 1, wherein the device further comprises:
    a demodulator and a decoder that decodes a received signal into one or more receiver streams that can be output in any combination of streams faster than real time; and
    a plurality of circular buffers for storing at least portions of the multiple broadcast streams, the plurality of circular buffers including the first circular buffer.

4. The device of claim 1, wherein the first circular buffer comprises a Layer 1 service stream circular buffer for storing and selective extraction of segments of the commercial content, and the non-commercial content based on navigation instructions and the processor is further operable to time shift trigger commercial content play based upon the selective navigation.

5. The device of claim 4, wherein
    the second circular buffer comprises a pause/replay circular buffer for storing and selective extraction of segments of the commercial content, and non-commercial content based on navigation instructions and the receiver further comprises
    a memory manager controlling the ability to bypass commercial content according to a broadcast configuration.

6. The device of claim 5, further comprising an indicator for indicating a current second circular buffer storage capacity remaining by providing one of a fuel gauge and a segment count already stored in the pause/replay circular buffer.

7. A multichannel broadcast system-comprising:
    a transmitter;
    at least one encoder coupled to the transmitter, wherein content segments including commercial audio, non-commercial audio, supplemental content and control information are multiplexed on each in-band on-channel (IBOC) channel of a multichannel digital audio broadcast (DAB):
    wherein the multichannel broadcast once demodulated and decoded enables selective navigation among the commercial audio, the non-commercial audio and the supplemental content without changing an IBOC channel;
    wherein, after the content from at least portions of the DAB has been locally buffered in at least one receiver, the control information selects one of a pre-set number of content selection algorithms used for navigation; and
    where the control information selects one of a set of content navigation algorithms, navigation algorithms navigate to a next buffered content segment based on prioritization of transport parameters including but not limited to a segment source stream and a segment order of reception.

8. A method of content navigation in a digital audio broadcast radio, comprising:
    receiving content from a multichannel signal that is broadcast containing commercial content and non-commercial content on multiple broadcast streams contained within a single channel and wherein one or more of the broadcast streams among the multiple broadcast streams contains supplemental content;

buffering in a first circular buffer at least portions of the multiple broadcast streams containing the commercial content, non-commercial content, and the supplemental content;

selecting portions of the multiple broadcast streams from the first circular buffer;

buffering in a second circular buffer the selected portions;

selectively navigating among the commercial content, the non-commercial content and the supplemental content stored in the first circular buffer and the second circular buffer without changing a channel; and time shifting triggering commercial content play based on the selective navigation.

9. The device according to claim 1 wherein selective navigation of content stored in the first circular buffer includes selectively navigating to a different broadcast stream of the multiple broadcast streams stored in the first circular buffer, and selective navigation of content stored in the second circular buffer includes selectively navigating portions of the selected content stored in the second circular buffer.

10. The receiver according to claim 1 wherein selective navigation includes pause/play navigation, forward/reverse navigation and different broadcast stream navigation, and pause/play navigation is performed on content stored in the first circular buffer and content stored in the second circular buffer, forward/reverse navigation is performed on content stored in the first circular buffer and content stored in the second circular buffer, and different broadcast stream navigation is performed on content stored in the first circular buffer and not performed on content stored in second circular buffer.

11. The receiver according to claim 10 wherein the processor is further operable to:

cause initial playing of content from the first circular buffer, receive a pause navigation signal;

cause termination of playing of content from the first circular buffer based upon the pause navigation signal;

receive a play navigation signal after the receiving the pause navigation signal; and cause playing of content from the second circular buffer based upon the play navigation signal.

12. The receiver according to claim 11 further wherein the processor is further operable to:

receive a different broadcast stream navigation signal after causing the playing of content from the second circular buffer; and cause playing of content from the first circular buffer based upon the different broadcast stream navigation signal.

13. A multichannel broadcast system-comprising:

a transmitter;

at least one encoder coupled to the transmitter, wherein content segments including commercial audio, non-commercial audio, supplemental content and control information are multiplexed on each in-band on-channel (IBOC) channel of a multichannel digital audio broadcast (DAB);

wherein the multichannel broadcast once demodulated and decoded enables selective navigation among the commercial audio, the non-commercial audio and the supplemental content without changing an IBOC channel; and wherein, after the content has been locally buffered in at least one receiver, the control information for a commercial audio segment controls the at least one receiver to block content navigation the first time the commercial audio segment is played on the at least one receiver, flag the commercial audio segment in memory as being played and enable content navigation during any subsequent replay of the commercial audio segment if the flag has been set.

* * * * *